(12) United States Patent
Valsecchi et al.

(10) Patent No.: US 10,941,316 B2
(45) Date of Patent: Mar. 9, 2021

(54) (PER)FLUOROPOLYETHER DERIVATIVES

(71) Applicant: SOLVAY SPECIALTY POLYMERS ITALY S.P.A., Bollate (IT)

(72) Inventors: Roberto Valsecchi, Verdellino (IT); Simonetta Antonella Fontana, Milan (IT); Fabrizio Mutta, Fino Mornasco (IT); Alberto Zompatori, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 108 days.

(21) Appl. No.: 16/302,475

(22) PCT Filed: May 11, 2017

(86) PCT No.: PCT/EP2017/061353
§ 371 (c)(1),
(2) Date: Nov. 16, 2018

(87) PCT Pub. No.: WO2017/198545
PCT Pub. Date: Nov. 23, 2017

(65) Prior Publication Data
US 2019/0276705 A1 Sep. 12, 2019

(30) Foreign Application Priority Data

May 16, 2016 (EP) .................................. 16169767

(51) Int. Cl.
| | | |
|---|---|---|
| *C09D 183/12* | (2006.01) | |
| *C08G 77/46* | (2006.01) | |
| *C09D 5/00* | (2006.01) | |
| *C09D 187/00* | (2006.01) | |
| *C08G 65/00* | (2006.01) | |
| *C08G 65/336* | (2006.01) | |
| *C08G 65/331* | (2006.01) | |

(52) U.S. Cl.
CPC ......... *C09D 183/12* (2013.01); *C08G 65/007* (2013.01); *C08G 65/331* (2013.01); *C08G 65/336* (2013.01); *C08G 77/46* (2013.01); *C09D 5/00* (2013.01); *C09D 187/005* (2013.01)

(58) Field of Classification Search
None
See application file for complete search history.

(56) References Cited

U.S. PATENT DOCUMENTS

| | | | |
|---|---|---|---|
| 5,274,159 A * | 12/1993 | Pellerite ............. | B01F 17/0071 556/485 |
| 6,183,872 B1 | 2/2001 | Tanaka et al. | |
| 6,200,684 B1 | 3/2001 | Yamaguchi et al. | |
| 6,277,485 B1 | 8/2001 | Invie et al. | |
| 6,528,672 B2 | 3/2003 | Yamaguchi et al. | |
| 6,841,190 B2 | 1/2005 | Liu et al. | |
| 7,294,731 B1 * | 11/2007 | Flynn .................... | C07F 7/1804 556/427 |
| 7,794,843 B2 | 9/2010 | Yamane et al. | |
| 2003/0207130 A1 * | 11/2003 | Pellerite ................. | C04B 33/00 428/447 |
| 2007/0207307 A1 * | 9/2007 | Yoneyama ........... | G02B 5/3058 428/313.5 |
| 2012/0264964 A1 * | 10/2012 | Honma ................. | C07F 7/1804 556/437 |
| 2015/0118502 A1 * | 4/2015 | Mitsuhashi .......... | C08G 65/336 428/429 |
| 2016/0304665 A1 * | 10/2016 | Sakoh ................... | C08G 65/007 |
| 2019/0062592 A1 * | 2/2019 | Shtarov ................. | C09D 4/00 |

FOREIGN PATENT DOCUMENTS

| | | |
|---|---|---|
| EP | 2915833 A1 | 9/2015 |
| EP | 3085749 A1 | 10/2016 |
| JP | 2002348370 A | 12/2002 |
| WO | 2009043928 A1 | 4/2009 |
| WO | 2010130628 A1 | 11/2010 |

\* cited by examiner

*Primary Examiner* — Robert S Loewe
(74) *Attorney, Agent, or Firm* — Osha Bergman Watanabe & Burton LLP

(57) ABSTRACT

The present invention relates to novel (per)fluoropolyether (PFPE) polymer derivatives, a method for their manufacture and their use for providing an anti-soiling coating.

11 Claims, No Drawings

(PER)FLUOROPOLYETHER DERIVATIVES

CROSS-REFERENCE TO RELATED APPLICATIONS

This application is a U.S. national stage entry under 35 U.S.C. 071 of International Application No. PCT/EP2017/061353 filed May 11, 2017, which claims priority to European application No. EP 16169767.7, filed May 16, 2016. The entire contents of these applications are explicitly incorporated herein by this reference.

TECHNICAL FIELD

The present invention relates to novel (per)fluoropolyether (PFPE) polymer derivatives, a method for their manufacture and their use for providing an anti-soiling coating.

BACKGROUND ART

Materials such as glass, metals and resins are used as substrate for a variety of articles, including notably portable devices such as smart phones, laptops and the like. The surface of these substrates is however liable to get stained by the adhesion of oily substances, due to frequent handling and contact with the users' face or fingers, jewellery and other objects. As a consequence, these substrates need to be subjected to a stain proof treatment so that the surface of the substrate is less adherent to dirt and the dirt can be easily removed.

The issue of a dirt surface became of particular importance in the last few years, with the diffusion of devices comprising an anti-reflection film that reduces the reflection loss on the surface of the substrate with use of light interference, which increases the transmittance of the substrate. When the surface of the above-mentioned transparent board having high transmittance is soiled, the soil is noticeable. When a fingerprint, sweat, or an oil film of a user adheres to a surface of the anti-reflection film, a light interference condition of the adhesion portion is changed and the soil is more noticeable, resulting in reducing the display visibility.

In order to provide substrates that are easy to clean and have anti-soiling and anti-fingerprint properties, coating layers comprising perfluoropolyether polymers have been disclosed in the art.

For example, U.S. Pat. No. 6,841,190 (3M INNOVATIVE PROPERTIES COMPANY) discloses a display element comprising a substantially transparent substrate, a hard-coat layer comprising inorganic particles dispersed in a binder matrix and an antisoiling layer comprising a perfluoropolyether atop the hard-coat. The perfluoropolyether contains pendent (e.g., terminal) polymerizable (e.g., acrylate or methacrylate) groups.

U.S. Pat. No. 6,277,485 (3M INNOVATIVE PROPERTIES COMPANY) discloses an anti-soiling coating for an anti-reflective surface, wherein the coating includes a fluorinated siloxane, preferably having the following formula:

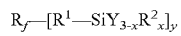

wherein $R_f$ is a monovalent or divalent perfluoropolyether group, $R^1$ is a divalent alkylene group, arylene group or combinations thereof, optionally containing one or more heteroatoms (e.g. oxygen, nitrogen or sulphur) or functional groups (e.g., carbonyl, amido or sulfonamido) and optionally substituted with halogens; $R^2$ is a lower alkyl group; Y is a halide, a lower alkoxy group or a lower acyloxy group, x is 0 or 1; and y is 1 or 2. The polymers disclosed in this patent document comprise only one substituted silicon group at each chain end.

U.S. Pat. No. 6,183,872 (DAIKIN INDUSTRIES LTD) discloses silicon-containing organic fluoropolymers having a number average molecular weight of from $5 \times 10^2$ to $1 = 10^5$ and being represented by the following general formula:

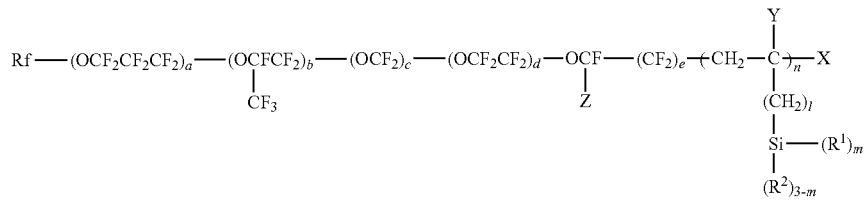

wherein

Rf represents perfluorolalkyl, Z represents fluoro or trifluoromethyl, Y represents hydrogen or alkyl containing 1 to 4 carbon atoms, X represents hydrogen, bromo or iodo, $R^1$ represents hydroxy or a hydrolysable substituent group and $R^2$ represent hydrogen or a monovalent hydrocarbon group; which are useful to provide a layer having anti-fouling properties. To this aim, it is important that number of reactive silicon atoms contained in the silicon-containing organic fluoropolymer is greater than 1 (i.e. in the above formula n represents an integer of 2 or above). In the polymers disclosed in this patent document, the group comprising the silicon atom and the perfluorinated backbone are linked together by an alkyl chain that does not comprise any heteroatom, such as oxygen atoms.

U.S. Pat. No. 6,200,684 (SHIN-ETSU CHEMICAL CO., LTD) discloses a perfluoropolyether-modified aminosilane having the following general formula:

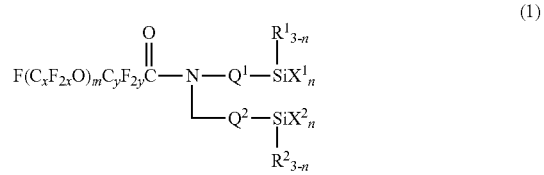

(1)

wherein $X^1$ and $X^2$ are each a hydrolyzable group, $R^1$ and $R^2$ are each a monovalent hydrocarbon group of 1 to 6 carbon atoms, $Q^1$ and $Q^2$ are a divalent organic group.

Similarly, U.S. Pat. No. 6,528,672 (SHIN-ETSU CHEMICAL CO., LTD.) discloses perfluoropolyether-modified aminosilane having the following general formula:

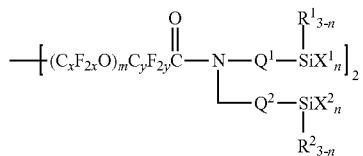

The polymers disclosed in the latter two patent documents comprise two silicon-containing groups at one chain end, which are linked to the perfluorinated backbone via an amido group.

JP 2002-348370 A (SHIN-ETSU CHEMICAL CO., LTD) discloses a perfluoropolyether-modified silane represented by the following general formula:

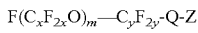

wherein Q is a divalent organic group, Z is a group of formula

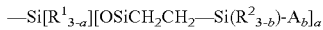

wherein A is a hydrolyzable group, $R^1$ and $R^2$ are each a monovalent organic group and a and b are integers from 1 to 3. The polymers disclosed in this patent document are poly-siloxane polymers, i.e. polymers comprising a functional group of formula —Si—O—Si—.

U.S. Pat. No. 7,794,843 (SHIN-ETSU CHEMICAL CO., LTD) discloses an organopolysiloxane represented by one of the following general formulae (A), (B) or (C):

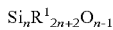           (A)

           (B)

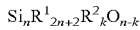           (C)

wherein one $SiR^1$ bond is represented by the following formula (ii) or one SiOSi bond is replaced with a bond represented by the following formula (iii):

           (ii)

           (iii)

wherein $R_f^1$ is a monovalent group containing a perfluoroether residue, $R_f^2$ is a divalent group containing a perfluoroether residue and Q is a divalent linking group.

None of the above mentioned documents however discloses the polymers according to the present invention.

EP 3085749 A (SHINETSU CHEMICAL CO.) relates to a fluoropolyether-containing polymer-modified silane, capable of forming a film, and to an article that has been surface-treated with the surface treating agent. The fluoropolyether-containing polymer-modified silane herein disclosed are characterized by comprising organopolysiloxane residues.

EP 2915833 A (DAIKIN IND. LTD.) relates to perfluoro(poly)ether group containing silane compounds, a method of producing the perfluoro(poly)ether group containing silane compound and a surface-treating agent comprising it. The perfluoro(poly)ether group containing silane compounds herein disclosed are characterized by comprising organopolysiloxane residues.

WO 2010/130628 (SOLVAY SOLEXIS S.P.A.) relates to a process for the purification of a polyol (per)fluoropolyether derivative comprising at least one (per)fluoropolyoxyalkylene chain and at least one end-group of formula —$CF_2CH_2OCH_2CH(OH)CH_2OCH_2CH(OH)CH_2OH$.

WO 2009/043928 (SOLVAY SOLEXIS S.P.A.) relates to a process for the manufacture of a polyol (per)fluoropolyether derivative by reaction of at least one triol having two protected hydroxyl functions and a free hydroxy group with an activating agent, and reacting the product thus obtained with a functional (per)fluoropolyether derivative.

SUMMARY OF INVENTION

The Applicant perceived that there is still the need for anti-soiling coatings, having notably resistance to fingerprints, skin oil, sweat and cosmetics and the like and suitable to provide transparent coatings.

The Applicant noted that some of the derivatives known from in the art contain linking groups that can be subject to hydrolysis, such as notably the amido group. Accordingly, the Applicant focused on derivatives of (per)fluoropolyether polymers bearing more than one silane group at one or both their chain ends, and free from linking groups that can undergo to hydrolysis.

Thus, in a first aspect, the present invention relates to a polymer [polymer P] comprising:
  at least one (per)fluoropolyether chain [chain ($R_{pf}$)] and
  at least two chains [chains ($R_e$)] bonded to opposite sides of said chain ($R_{pf}$),
  wherein at least one chain ($R_e$) comprises a branched alkyl chain interrupted by at least two oxygen atoms [chain ($C_o$)], and two or more alkoxy-silane groups [groups (Si)].

The Applicant found that when polymer P is applied onto at least part of the surface of a substrate, oil and water repellent coatings are obtained, also showing good anti-soiling and anti-fingerprint properties. Furthermore, polymer P can be easily spread onto the surface of the substrate, thus achieving uniform properties over the whole treated surface.

To this aim, polymer P can be used as such or instead as ingredient in a composition [composition C] further comprising at least one solvent.

Thus, in a second aspect, the present invention relates to a method for coating at least part of the surface of a substrate, said method comprising step (m1) of contacting at least one part of the surface of a substrate with at least one polymer P or with composition C, as defined above.

DESCRIPTION OF EMBODIMENTS

For the purpose of the present description and of the following claims:
  the use of parentheses around symbols or numbers identifying the formulae, for example in expressions like "polymer (P)", etc., has the mere purpose of better distinguishing the symbol or number from the rest of the text and, hence, said parenthesis can also be omitted;
  the acronym "PFPE" stands for "(per)fluoropolyether" and, when used as substantive, is intended to mean either the singular or the plural form, depending on the context;
  the term "(per)fluoropolyether" is intended to indicate fully or partially fluorinated polyether polymer.

Preferably, said chain ($R_{pf}$) is a chain of formula:

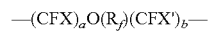

wherein
a and b, equal or different from each other, are equal to or higher than 1, preferably from 1 to 10, more preferably from 1 to 3;

X and X', equal or different from each other, are —F or —CF$_3$, provided that when a and/or b are higher than 1, X and X' are —F;

(R$_f$) comprises, preferably consists of, repeating units R°, said repeating units being independently selected from the group consisting of:
(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CW$_2$O—, wherein each of W, equal or different from each other, are F, Cl, H;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being chosen among the following: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$-C$_3$ perfluoroalkyl group.

More preferably, a and b, equal or different from each other, are from 1 to 10, even more preferably from 1 to 3.

Preferably, chain (R$_f$) complies with the following formula:

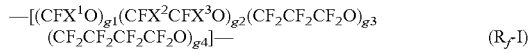
(R$_f$-I)

wherein
X$^1$ is independently selected from —F and —CF$_3$,
X$^2$, X$^3$, equal or different from each other and at each occurrence, are independently —F, —CF$_3$, with the proviso that at least one of X is —F;
g1, g2, g3, and g4, equal or different from each other, are independently integers 20, such that g1+g2+g3+g4 is in the range from 2 to 300, preferably from 2 to 100; should at least two of g1, g2, g3 and g4 be different from zero.

More preferably, chain (R$_f$) is selected from chains of formula:

—[(CF$_2$CF$_2$O)$_{a1}$(CF$_2$O)$_{a2}$]—    (R$_f$-IIA)

wherein:
a1 and a2 are independently integers ≥0 such that the number average molecular weight is between 400 and 10,000, preferably between 2,000 and 8,000; both a1 and a2 are preferably different from zero, with the ratio a1/a2 being preferably comprised between 0.1 and 10;

—[(CF$_2$CF$_2$O)$_b$]—    (R$_f$-IIB)

wherein:
b is an integer >0 such that the number average molecular weight is between 400 and 10,000, preferably between 2,000 and 8,000;

—[(CF$_2$CF$_2$CF$_2$CF$_2$O)$_c$]—    (R$_f$-IIC)

wherein:
c is an integer >0 such that the number average molecular weight is between 400 and 10,000, preferably between 2,000 and 8,000;

(R$_f$-IID)

wherein:
d1, d2, d3, d4, are independently integers ≥0 such that the number average molecular weight is between 400 and 10,000, preferably between 2,000 and 8,000; preferably d1 is 0, d2, d3, d4 are >0, with the ratio d4/(d2+d3) being ≥1;

—[(CF$_2$CF$_2$O)$_{e1}$(CF$_2$O)$_{e2}$(CF$_2$(CF$_2$)$_{ew}$CF$_2$O)$_{e3}$]—    (R$_f$-IIE)

wherein:
ew=1 or 2;
e1, e2, and e3 are independently integers ≥0 chosen so that the number average molecular weight is between 400 and 10,000, preferably between 2,000 and 8,000; preferably e1, e2 and e3 are all >0, with the ratio e3/(e1+e2) being generally lower than 0.2;

—[(CF(CF$_3$)CF$_2$O)$_f$]—    (R$_f$-IIF)

wherein:
f is an integer >0 such that the number average molecular weight is between 400 and 10,000, preferably between 2,000 and 8,000.

Chains (R$_f$-IIA), (R$_f$-IIB), (R$_f$-IIC) and (R$_f$-IIE) are particularly preferred.

Still more preferably, chain (R$_f$) complies with formula (R$_f$-IIA), wherein:
a1, and a2 are integers >0 such that the number average molecular weight is between 400 and 10,000, preferably between 2,000 and 8,000, with the ratio a1/a2 being generally comprised between 0.1 and 10, more preferably between 0.2 and 5;

Preferably, said at least one chain (R$_e$) is free from further functional groups, such as for example, amino groups, amido groups, ester groups, keto groups, urethane groups, siloxane groups and the like.

Chain(s) (R$_e$) comprising chain (C$_o$) and groups (Si) is(are) linked to chain (R$_{pf}$) via group (B). When one chain (R$_e$) comprises a neutral group, it is linked to chain (R$_{pf}$) via a sigma bond.

Preferably, group (B) is a divalent alkyl chain comprising from 1 to 20, more preferably from 1 to 10 carbon atoms, said alkyl chain being optionally interrupted by at least one oxygen atom and/or optionally substituted with a perfluoroalkyl group comprising from 1 to 3 carbon atoms.

Preferably, group (B) is selected from —CH$_2$—O—, —CH(CF$_3$)—O— and —CH$_2$(OCH$_2$CH$_2$)$_n$—O— wherein n is an integer from 1 to 15, more preferably from 1 to 10, even more preferably from 1 to 7, such as for example from 4 to 7.

Preferably, said chain (C$_o$) is a branched alkyl chain comprising from 7 to 50, more preferably from 9 to 35 carbon atoms, and at least two oxygen atoms, preferably from 2 to 12 oxygen atoms, more preferably from 2 to 10 oxygen atoms.

Preferably, said chain (C$_o$) complies with one of the following general structures (C$_o$-I) to (C$_o$-VI):

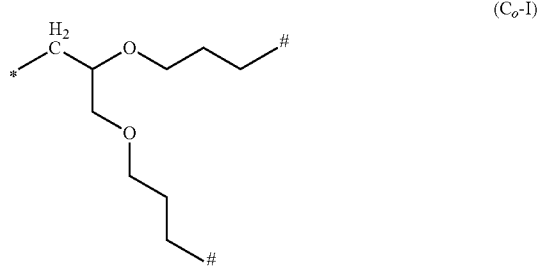
(C$_o$-I)

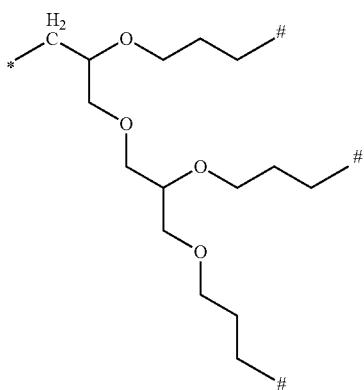
(C$_o$-II)

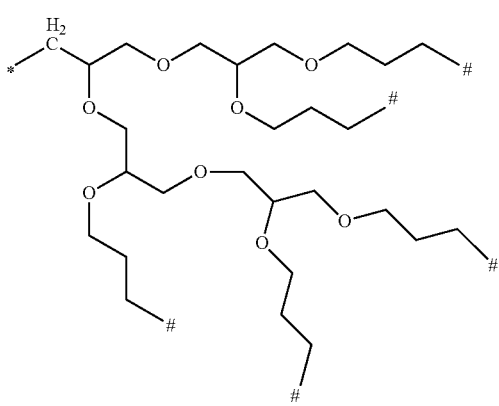
(C$_o$-III)

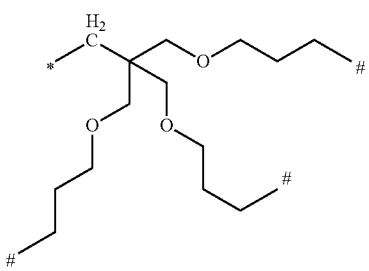
(C$_o$-IV)

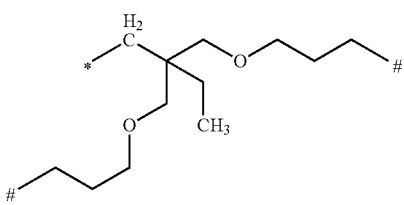
(C$_o$-V)

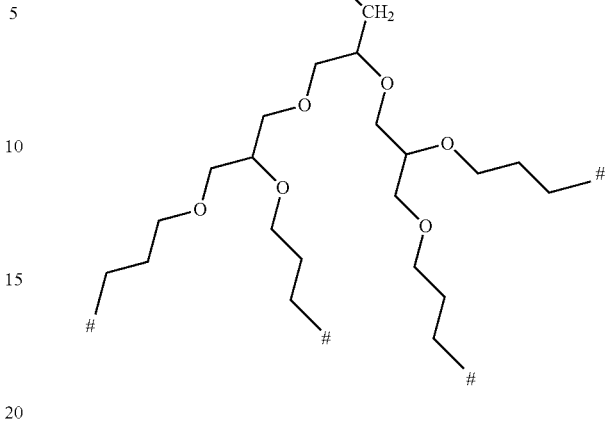
(C$_o$-VI)

wherein the symbol (*) indicates the bond with chain (R$_{pf}$) or group (B) and the symbol (#) indicates the bond with group (Si).

Preferably, chain(s) (R$_e$) comprise(s) two or more groups (Si), more preferably from 2 to 50, more preferably from 2 to 15 and even more preferably from 2 to 6 groups (Si).

Preferably, said group (Si) is a group of formula —Si(R$^1$)(R$^2$)(R$^3$), wherein R$^1$, R$^2$ and R$^3$, each independently, are selected from the group comprising: halogen atom, more preferably chlorine; linear or branched alkyl groups having from 1 to 10 carbon atoms, more preferably methyl, ethyl, n-propyl, isopropyl; alkoxy groups, wherein the alkyl chain is linear or branched and comprises from 1 to 6 carbon atoms, more preferably methoxy, ethoxy, n-propoxy, iso-propoxy; aliphatic and aromatic rings optionally substituted and optionally comprising heteroatoms, more preferably cyclohexyl, phenyl and 2-phenyl-propyl;

provided that at least one of R$^1$, R$^2$ and R$^3$ is an alkoxy group.

More preferably, at least two of R$^1$, R$^2$ and R$^3$ are an alkoxy group. Even more preferably, R$^1$, R$^2$ and R$^3$ are all alkoxy group.

In a preferred embodiment, polymer P comprises one chain (R$_{pf}$) and two chains (R$_e$) bonded to opposite sides of said chain (R$_{pf}$), wherein one chain (R$_e$) comprises chain (C$_o$) and two or more groups (Si) as defined above and the other chain (R$_e$) comprises a neutral group selected in the group comprising —H, —F, —Cl and a straight or branched perfluoroalkyl group comprising from 1 to 3 carbon atoms.

When one chain (R$_e$) comprises a neutral group as defined above and the other chain (R$_e$) comprises chain (C$_o$) and groups (Si), polymer P is also referred to as "monofunctional polymer P".

When two chains (R$_e$) comprise chain (C$_o$) and groups (Si) as defined above, polymer P is also referred to as "bifunctional polymer P".

Preferred embodiments of polymers P are those of formula (P-I) and (P-II):

$$T\text{-}(CF_2)_{x^*}\text{—}O(R_f)\text{—}(CF_2)_{y^*}\text{—}B\text{—}(R_e) \quad (P\text{-}I)$$

$$(R_e)\text{—}B\text{—}(CF_2)_{x^*}\text{—}O(R_f)\text{—}(CF_2)_{y^*}\text{—}B\text{—}(R_e) \quad (P\text{-}II)$$

wherein

T is selected from —H, —F, —Cl and a straight or branched perfluoroalkyl group comprising from 1 to 3 carbon atoms, more preferably T is —F or perfluoromethyl;

($R_f$) is a chain of formula ($R_f$-IIA), ($R_f$-IIB), ($R_f$-IIC) or ($R_f$-IIE) as defined above;

x* and y* are integers from 1 to 3;

B is a group of formula —CH$_2$O— and ($R_e$) is a chain having one of the following formulae ($R_e$-I) to ($R_e$-VI):

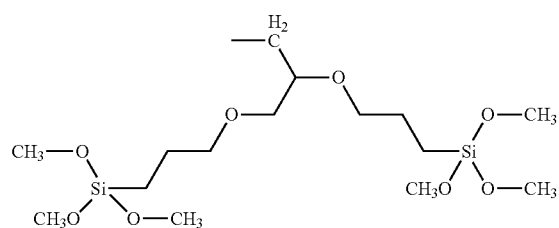
($R_e$-I)

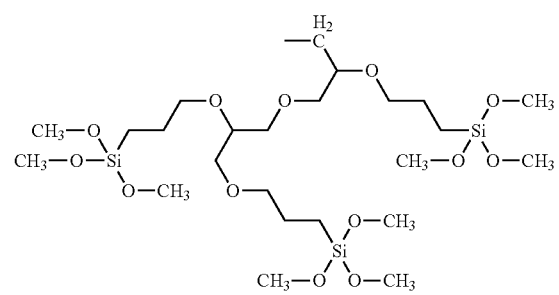
($R_e$-II)

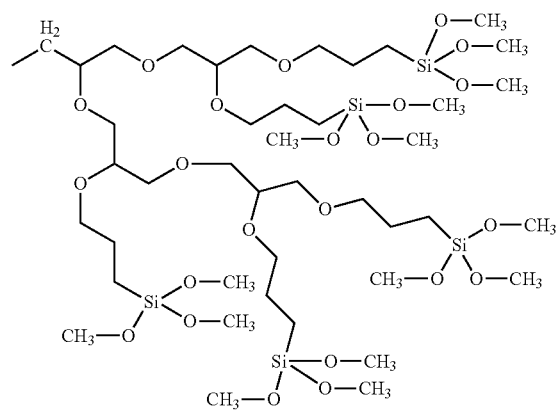
($R_e$-III)

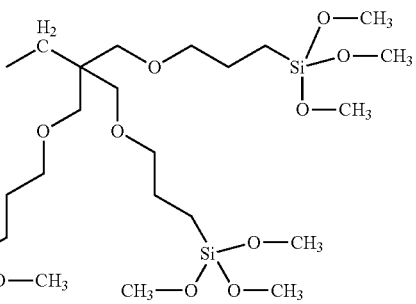
($R_e$-IV)

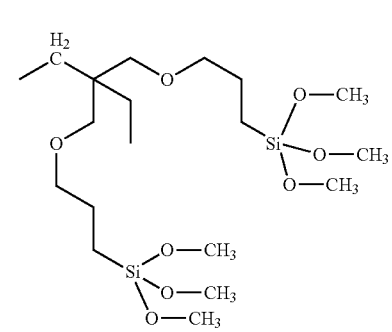
($R_e$-V)

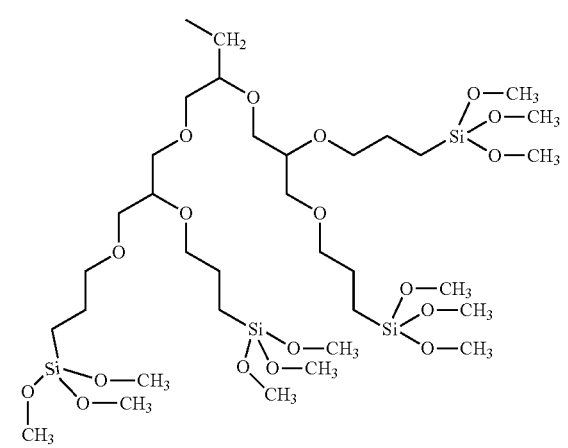
($R_e$-VI)

More preferred embodiments of polymers P are those of formula (P-III):

$$\text{T-(CF}_2)_{x^*}\text{—O(R}_f)\text{—(CF}_2)_{y^*}\text{—B—(C}_o)\text{—[Si(R}^1)(R^2)(R^3)]_p \quad \text{(P-III)}$$

wherein ($R_f$), x*, y*, B, ($C_o$), $R^1$, $R^2$ and $R^3$ are as defined above, T is selected from —H, —F, —Cl and a straight or branched perfluoroalkyl group comprising from 1 to 3 carbon atoms, and p is an integer equal to or higher than 2, preferably from 2 to 6.

More preferably T is —F or perfluoromethyl.

Suitable examples of polymers P are represented hereinafter:
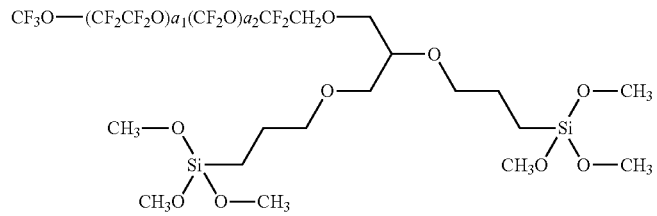
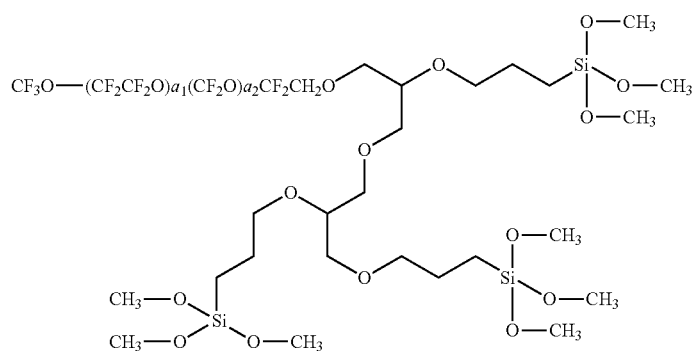
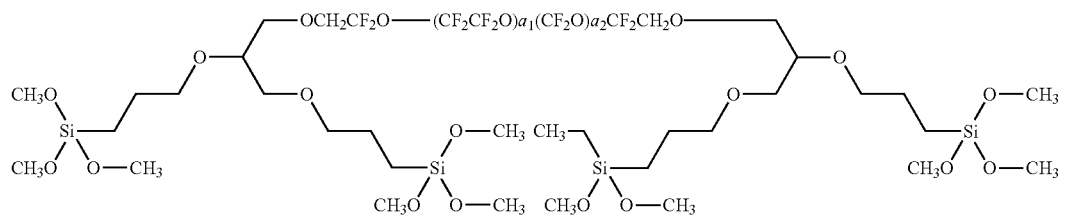
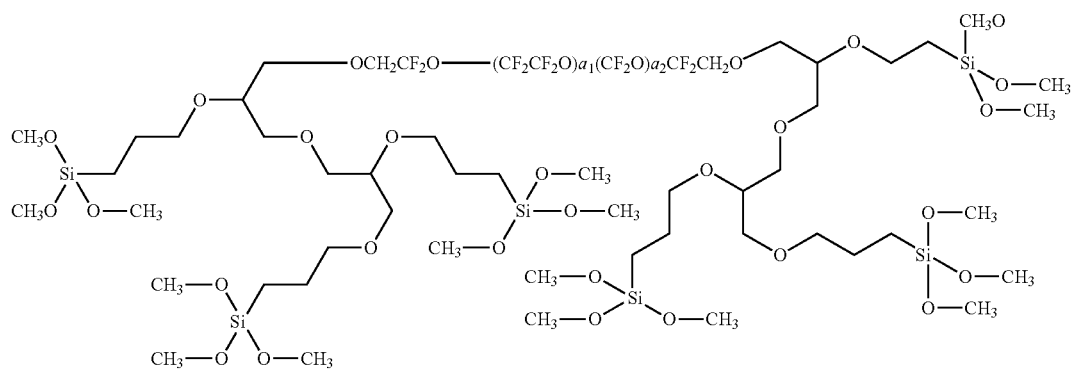
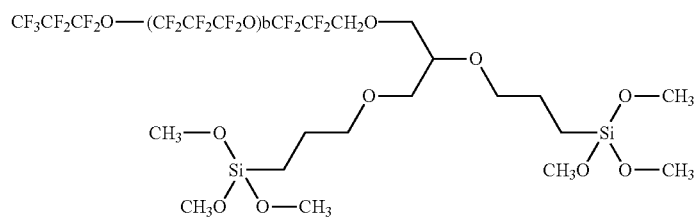

-continued
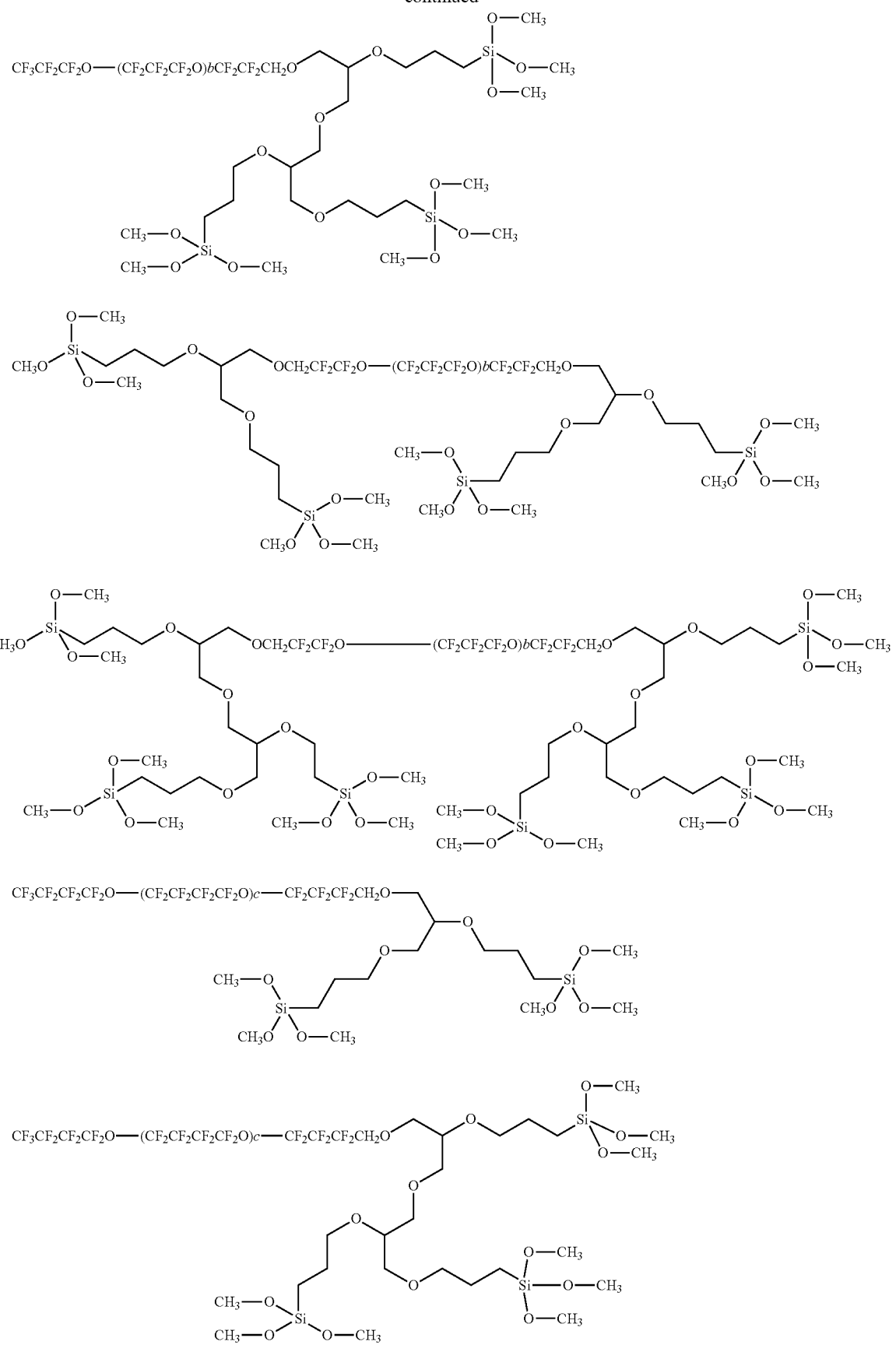

-continued
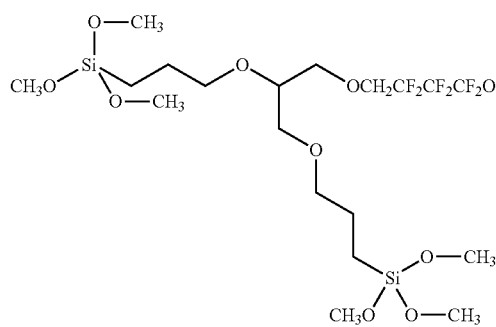
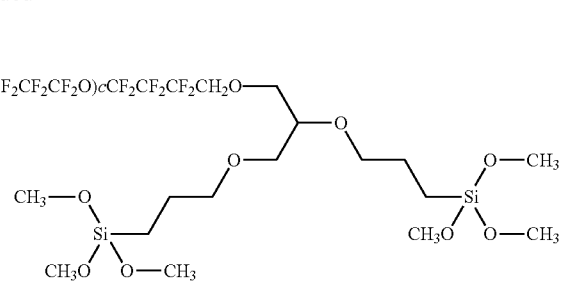
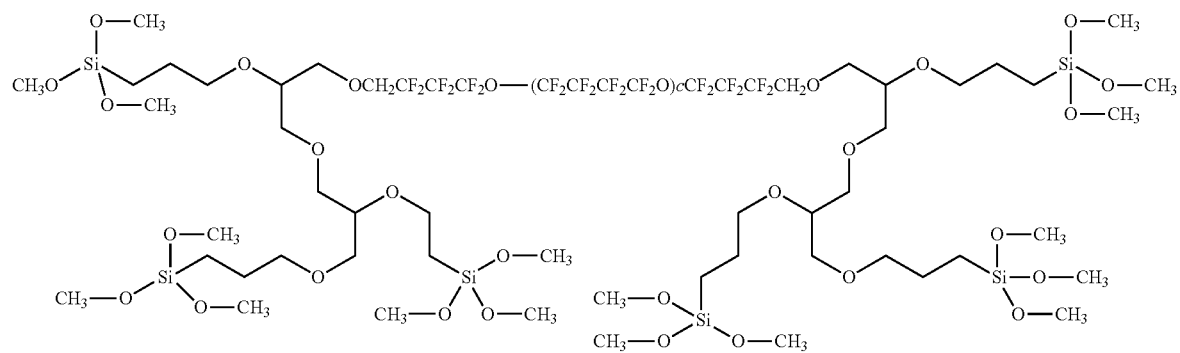
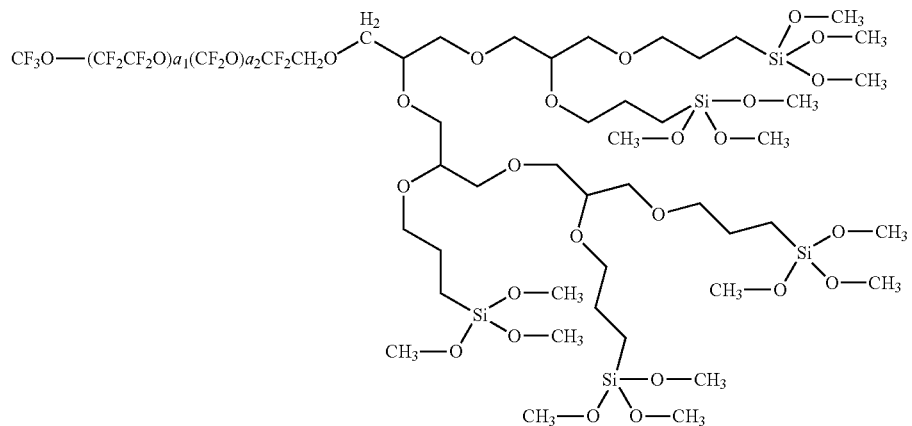
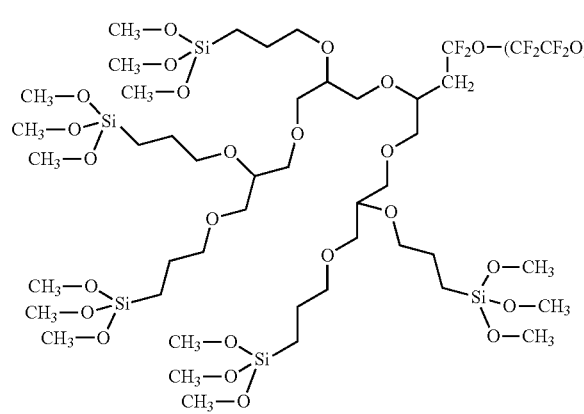
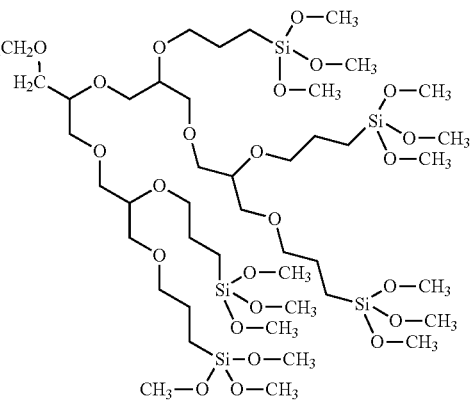

-continued
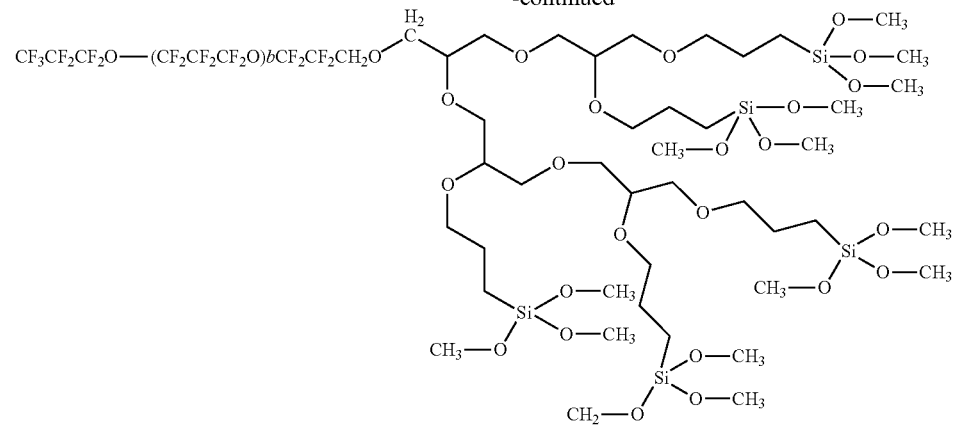
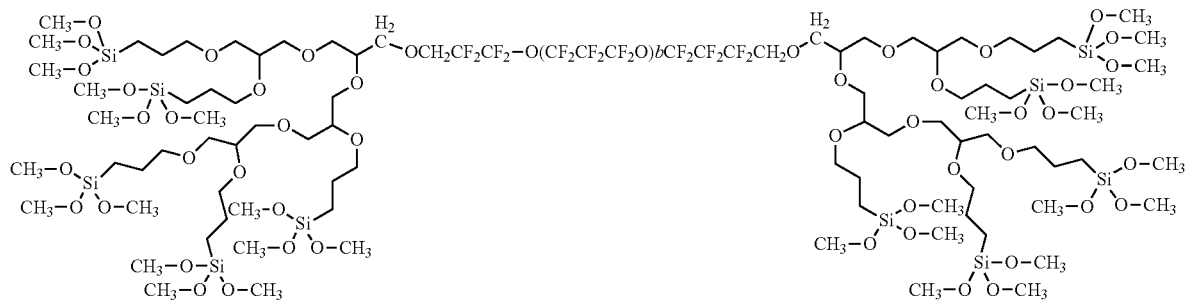
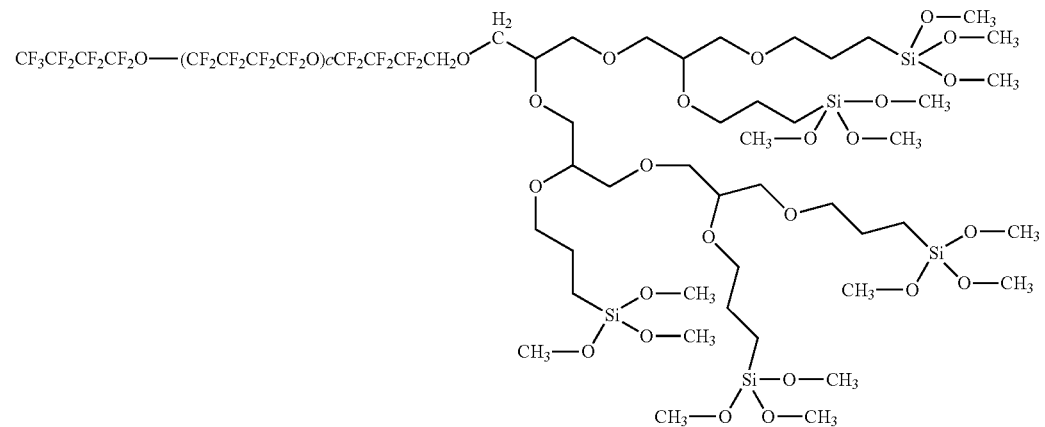
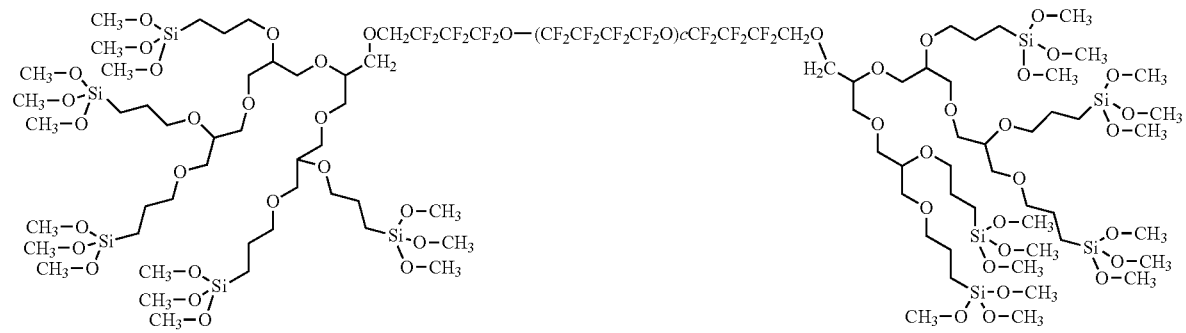
wherein
a1, a2, b and c are independently integers higher than zero, such that the number average molecular weight is between 2,000 and 8,000 and
the ratio a1/a2 is comprised between 0.1 and 10.
Mono-functional polymers P are particularly preferred.
Polymer P can be advantageously prepared starting from PFPE alcohols, i.e. polymers comprising a fully or partially fluorinated polyether chain ($R_{pf}$) having two chain ends, wherein at least one chain end bears at least one hydroxy group.

Mono-functional polymer P is preferably prepared starting from mono-functional PFPE alcohols, i.e. PFPE comprising hydroxy group(s), preferably one hydroxy group, at one chain end only.

Bi-functional polymer P is preferably prepared starting from bi-functional PFPE alcohols, i.e. PFPE comprising hydroxy group(s), preferably one hydroxy group, at both chain ends.

Polymer P can be advantageously prepared by a process [process P] comprising the following steps:

(I) providing at least one PFPE-alcohol as defined above;

(II) reacting said PFPE-alcohol with a compound [compound (O)] comprising at least two protected hydroxy groups and a group reactive with the hydroxy group of the PFPE-alcohol, to give a polymer [polymer ($Pp^{\#1}$)] comprising a (per)fluoropolyether chain [chain ($R_{pf}$)] having two chain ends, wherein at least one chain end comprises a linear or branched alkyl chain optionally interrupted by at least one oxygen atom, and at least two protected hydroxy groups;

(III) deprotecting the at least two protected hydroxy groups in polymer ($Pp^{\#1}$) obtained in step (II) above, to give a polymer [polymer ($P^{\#1}$)] comprising a (per)fluoropolyether chain [chain ($R_{pf}$)] having two chain ends, wherein at least one chain end comprises a linear or branched alkyl chain optionally interrupted by at least one oxygen atom, and at least two hydroxy groups;

(IV) reacting polymer ($P^{\#1}$) obtained in step (III) above, with at least one compound comprising at least one alkenyl group [compound A], to give a polymer [polymer ($P^{\#2}$)] comprising a (per)fluoropolyether chain [chain ($R_{pf}$)] having two chain ends, wherein at least one chain end comprises a linear or branched alkyl chain interrupted by at least two oxygen atoms, and at least two alkenyl groups;

(V) reacting polymer ($P^{\#2}$) obtained in step (IV) above, with an alkoxy-silane compound [compound Si], to give polymer P.

Suitable PFPE-alcohol(s) can be obtained according to methods known in the art and are commercially available, for example from Solvay Specialty Polymers Italy S.p.A. under the trade name Fomblin®.

Said compound (O) is preferably selected from:

activated protected triol compounds [compound ($O^{p1}$)] comprising an alkyl chain bearing at least two hydroxy groups in protected form and a functional group having high reactivity toward nucleophilic attack and epoxide compounds [compound ($O^{p2}$)] comprising an alkyl chain bearing at least two hydroxy groups in protected form and an epoxide group, said alkyl chain being optionally interrupted by oxygen atoms.

Preferably, said compound ($O^{p1}$) can be obtained by reacting a polyol compound [compound T] bearing three or more hydroxy groups with a protecting agent, to yield a protected polyol [compound ($T^p$)] having two or more protected hydroxy groups and one free unprotected hydroxy group, and reacting said compound ($T^p$) with an activating agent, to give compound ($O^{p1}$).

As used within the present description and in the following claims, the terms "protected" and "protective group" denote a reversible chemical modification of two or more hydroxy groups of compound T in order to obtain chemoselectivity in a subsequent chemical reaction toward the free unprotected hydroxy group of compound ($T^p$).

Preferably, the hydroxy groups in compound T can be protected by transformation in acetals/ketals, ethers, oxetanes and the like.

Preferably, said compound T bears three hydroxy groups.

Non limitative examples of compound T are glycerol, trimethylol-propane, trimethylol-ethane, hexane-1,2,6-triol, butane-1,2,4-triol.

Protective agents for hydroxyl groups are for example dihydropyran, compounds bearing aldehyde or keto groups, ethers and the like.

Activating agents are preferably selected from those of formula:

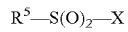

wherein

X is chlorine or bromine, and $R^5$ is selected in the group comprising: linear or branched alkyl chain having from 1 to 12 carbon atoms, optionally comprising fluorine atoms; and aryl group, optionally substituted with one or more alkyl groups having from 1 to 3 carbon atoms.

More preferred activating agents are selected from tosyl halides, brosyl halides, triflyl halides, mesyl halides, nonaflyl halides. Mesyl halides are even more preferred.

Good results have been obtained using the mesyl derivative of Solketal as compound ($O^{p1}$).

Preferably, said compound ($O^{p2}$) can be obtained by reacting compound $T^p$ as defined above with an epoxy-alkyl halide.

Preferably, said epoxy-alkyl halide is epibromohydrin.

Good results have been obtained using glycidyl Solketal ether as compound ($O^{p2}$).

Step (II) is advantageously performed in the presence of a base.

Preferably, said base is selected from hydroxides or carbonates of alkaline and alkaline-earth metals.

Preferably, said step (II) is performed in the presence of an aprotic solvent, such as for example 1,3-bis(trifluoromethyl)benzene, perfluoropolyethers such as for example GALDEN® perfluoropolyethers commercially available from Solvay Specialty Polymers Italy S.p.A., hydrofluoroethers such as for example NOVEC™ HFE 7200 commercially available from 3M; trifluoromethyl benzene, acetonitrile and mixtures thereof.

Optionally, said aprotic solvent is in an admixture with a tertiary-alcohol, such as for example tert-butanol.

Preferably, said step (II) is performed under heating, more preferably at a temperature of from about 50° C. to about 120° C.

Preferably, said step (II) is performed using an excess (on an equivalent basis) of compound ($O^{p1}$) or of compound ($O^{p2}$) to the PFPE-alcohol.

Step (III) can be carried out using conditions that depend on the protective group used in step (II).

For example, when the protective group is acetal or ketal group, step (III) is advantageously performed by hydrolysis in acidic conditions.

When the protective group is ether group, step (III) is advantageously performed by hydrolysis in acidic conditions or hydrogenolysis.

Optionally and depending on the starting materials used, before step (IV), step (II) and (III) can be performed two times or more, for example when polymer P comprising 4 silane groups is desired.

Preferably, said compound (A) is selected in the group comprising alkenyl-halide and alkenyl-alcohol. Advantageously, the alkenyl group is a terminal group.

Suitable examples of compound (A) comprise allyl halides, vinyl halides, butenyl halides.

According to a first embodiment of step (IV) [step (IV-a)], the following step is performed:

(IV-a) reacting polymer ($P^{\#1}$) obtained in step (III) above with a compound [compound ($A^{a1}$)] comprising at least one allyl group and a functional group having high reactivity toward nucleophilic attack, to give polymer ($P^{\#2}$) as defined above.

Preferably, step (IV-a) is performed in the presence of a strong base, such that the alkoxide of polymer ($P^{\#1}$) reacts with compound ($A^{a1}$).

Preferably, said strong base is selected for example from hydroxides and alkoxides of alkaline metals, including notably lithium, sodium and potassium hydroxides, potassium tert-butoxide, and the like.

More preferably, a said base is used in a stoichiometric amount or in excess (on an equivalent basis) to the PFPE-alcohol.

Preferably, compound ($A^{a1}$) is an allyl halide, more preferably allyl iodide.

According to a second embodiment of step (IV) [step (IV-b)], the following steps are performed:

(IV-b1) reacting polymer ($P^{\#1}$) obtained in step (III) above with an activating agent as defined above, to give the corresponding polymer [polymer ($P^{\#1}a$)] comprising a (per)fluoropolyether chain [chain ($R_{pf}$)] having two chain ends, wherein at least one chain end comprises a linear or branched alkyl chain interrupted by at least one oxygen atom and at least two functional groups having high reactivity toward nucleophilic attack, and (IV-b2) reacting said polymer ($P^{\#1a}$) obtained in step (IV-b1) with an allyl-alcohol [compound ($A^{b2}$)], to give polymer ($P^{\#2}$) as defined above.

Preferably, step (IV-b2) is performed in the presence of a strong base, such that the alkoxide of compound ($A^{b2}$) reacts with polymer ($P^{\#1a}$).

Preferably, said step (IV-a) and step (IV-b2) are performed in the presence of an aprotic solvent, such as for example bis(trifluoromethyl)benzene. More preferably said aprotic solvent is in an admixture with a tertiary-alcohol, such as for example tert-butanol.

Preferably, said step (IV-a) and step (IV-b2) are performed under heating, more preferably at a temperature of from about 50° C. to about 120° C.

Preferably, said compound (Si) is a compound of formula

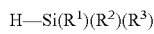

wherein $R^1$, $R^2$ and $R^3$ are as defined above.

Preferably, said step (V) is performed in the presence of a catalyst, suitable for promoting the hydrosilylation reaction.

Suitable catalysts are selected for example in the group comprising: platinum catalysts, such as chloroplatinic acid; complexes of platinum with olefin, alkenylsiloxane, beta-diketones, phosphine, carbene; catalysts based on rhodium, ruthenium, iridium and palladium, such as $RhCl(PPh_3)_3$, $RhCl(CO)(PPh_3)_2$, $Ru_3(CO)_{12}$, $IrCl(CO)(PPh_3)_2$, $Pd(PPh_3)_4$ wherein Ph is phenyl. Platinum catalysts are particularly preferred.

Alternatively, polymer P can be advantageously prepared by a process [process $P^X$] comprising the following steps:
($I^X$) providing at least one PFPE-alcohol as defined above;
($II^X$) reacting said PFPE-alcohol with a compound [compound $A^X$] comprising at least two alkenyl groups and one hydroxy group, to give a polymer [polymer ($P^{\#2}$)] as defined above;

($III^X$) reacting polymer ($P^{\#2}$) obtained in step ($II^X$) above with an alkoxy-silane compound [compound Si], to give polymer P.

The PFPE-alcohol used in step ($I^X$) is as defined above for process P.

Preferably, step ($III^X$) is performed using the conditions and the reagents disclosed above for step (V) of process P.

Advantageously, step ($II^X$) is performed by reacting either the PFPE-alcohol or compound ($A^X$) with an activating agent, as disclosed above.

Preferably, compound ($A^X$) is selected from pentaerythritol-triallyl ether and trimethylolpropane-diallyl ether.

The person skilled in the art would easily understand that at the end of process P or of process $P^X$, mixtures comprising polymer P with minor amounts (more preferably traces) of side-products deriving from the synthesis of polymer P can be obtained.

For example, after step (V) or step ($III^X$), a mixture can be obtained comprising:
polymer P according to the present invention,
polymer [polymer $P^{\#3}$] comprising a (per)fluoropolyether chain [chain ($R_{pf}$)] having two chain ends, wherein at least one chain end comprises a linear or branched alkyl chain interrupted by at least two oxygen atoms, and one or more vinyl-ether group(s).

Without being bound by any theory, the Applicant found that the allyl groups in polymer ($P^{\#2}$) can transpose to the vinyl group(s) in polymer ($P^{\#3}$).

During the synthesis of polymer P, the Applicant isolated intermediate polymers that are considered to be novel.

Thus, in a further aspect, the present invention relates to a polymer [polymer ($P^{\#1}$)] comprising at least one (per)fluoropolyether chain [chain ($R_{pf}$)] and at least two chains [chains ($R_e^{\#1}$)] bonded to opposite sides of said chain ($R_{pf}$),
wherein at least one chain ($R_e^{\#1}$) comprises a linear or branched alkyl chain interrupted by two or more oxygen atoms [chain ($C_o^{\#1}$)], and five or six hydroxy groups.

Preferably, chain ($R_e^{\#1}$) is linked to said chain ($R_{pf}$) via a bridging group [group ($B^{\#1}$)].

Preferably, said group ($B^{\#1}$) has the same meanings defined above for group B.

Preferably, said chain ($C_o^{\#1}$) is a branched alkyl chain comprising from 9 to 18 carbon atoms, and three or more oxygen atom(s).

Preferably, said chain ($R_e^{\#1}$) complies with the following formula ($R_e^{\#1}$-I):

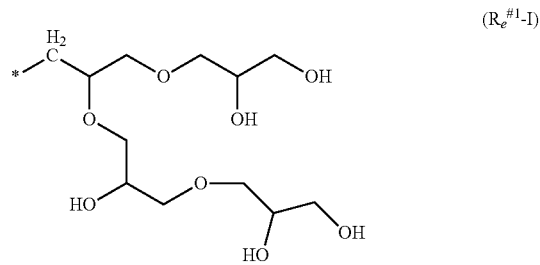 [SMILES: *CC(COCC(O)CO)OCC(O)COCC(O)CO]

($R_e^{\#1}$-I)

wherein the symbol (*) indicates the bond to chain ($R_{pf}$) or to group ($B^{\#1}$).

Preferred embodiments of polymers ($P^{\#1}$) are those of formula ($P^{\#1}$-I) and ($P^{\#1}$-II):

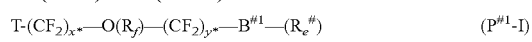
($P^{\#1}$-I)

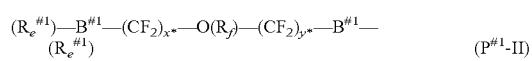
($P^{\#1}$-II)

wherein

T, ($R_f$), x*, y*, $B^{\#1}$ are as defined above and ($R_e^{\#1}$) complies with formula ($R_e^{\#1}$-I) above.

In a further aspect, the present invention relates to a polymer [polymer ($P^{\#2}$)] comprising at least one (per)fluoropolyether chain [chain ($R_{pf}$)] and at least two chains [chains ($R_e^{\#2}$)] bonded to opposite sides of said chain ($R_{pf}^{\#2}$), wherein at least one chain ($R_e^{\#2}$) comprises a branched alkyl chain interrupted by at least two oxygen atoms [chain ($C_o^{\#2}$)], and at least two alkenyl groups.

Preferably, chain ($R_e^{\#2}$) is linked to said chain ($R_{pf}$) via a bridging group [group $B^{\#2}$].

Preferably, said group $B^{\#2}$ has the same meanings defined above for group B.

Preferably, said chain ($C_o^{\#2}$) is a branched alkyl chain comprising from 7 to 38, preferably from 8 to 35, more preferably from 9 to 27 carbon atoms and at least two oxygen atoms.

Preferably, said chain ($R_e^{\#2}$) complies with one of the following general structures ($R_e^{\#2}$-I) to ($R_e^{\#2}$-VI):

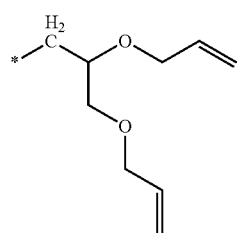
($R_e^{\#2}$-I)

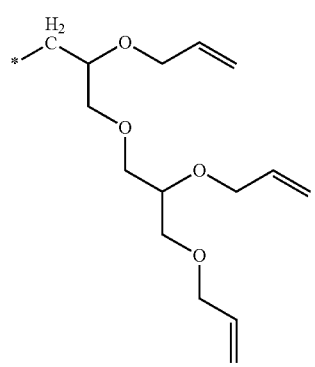
($R_e^{\#2}$-II)

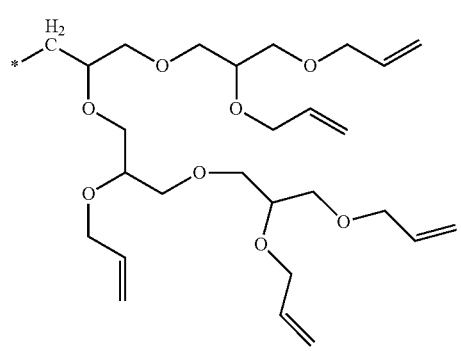
($R_e^{\#2}$-III)

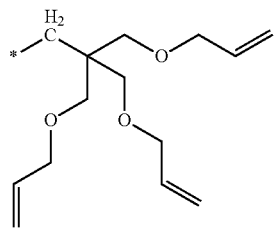
($R_e^{\#2}$-IV)

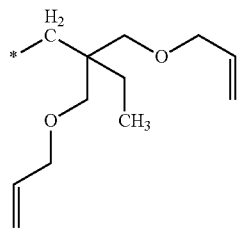
($R_e^{\#2}$-V)

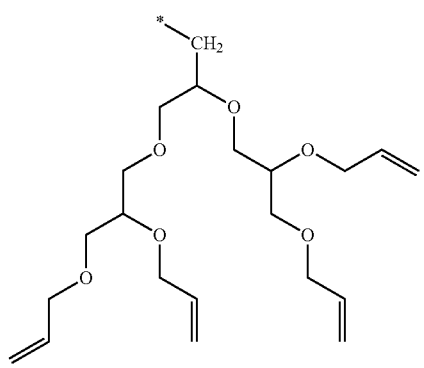
($R_e^{\#2}$-VI)

wherein the symbol (*) indicates the bond to chain ($R_{pf}$) or group ($B^{\#2}$).

Preferred embodiments of polymers ($P^{\#2}$) are those of formula ($P^{\#2}$-I) and ($P^{\#2}$-II):

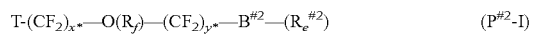
($P^{\#2}$-I)

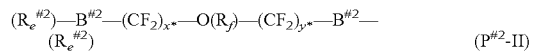
($P^{\#2}$-II)

wherein

T, ($R_f$), x*, y*, $B^{\#2}$ are as defined above and ($R_e^{\#2}$) complies with one of formulae ($R_e^{\#2}$-I) to ($R_e^{\#2}$-VI) above.

Polymer (P) can be used as such or it can be provided a composition [composition C] comprising at least one polymer P, optionally in admixture with reaction by-products, and at least one solvent.

Said at least one solvent is not particularly limited, and it is preferably selected from substantially inert solvent (i.e. non-reactive with polymer P), aprotic and capable of dispersing or dissolving polymer P. Examples of said solvents include aliphatic and aromatic hydrofluorocarbons (for example, trifluorotoluene and m-Xylene hexafluoride), hydrofluoroethers (HFEs) for example methyl-perfluorobutyl-ether, ethyl-perfluorobutyl-ether and perfluoro(2-butyltetrahydrofuran), hydrochlorofluoro alkanes and ethers, fluorine-containing alkylamine solvents (such as perfluorotributylamine and perfluorotripentylamine), and mixtures thereof.

Preferably, said composition C contains less than 60 wt. % of at least one polymer P, more preferably less than 50 wt. % and even more preferably less than 40 wt. % based on the total weight of composition C.

Preferably, said composition C contains more than 0.001 wt. % of at least one polymer P, more preferably more than 0.01 wt. % and even more preferably more than 0.1 wt. % based on the total weight of composition C.

Preferably, said composition C contains from 0.5 to 40 wt. % of at least one polymer P, more preferably from 0.75 to 30 wt. % and even more preferably from 1 to 25 wt. % based on the total weight of composition C.

Preferably, said composition C contains from 60 to 99.999 wt. % of at least one solvent, more preferably from 70 to 99.99 and even more preferably from 75 to 99.9 wt. % based on the total weight of composition C.

It will be clear to the person skilled in the art that composition C can be used as such or it can be added with at least one further ingredient.

Further ingredients, when present can be in an amount of from 0.01 to 25 wt. % based on the total weight of composition C.

Suitable further ingredients can be selected for example from the group comprising (per)fluoropolyether oils free from silane groups, silane-containing (per)fluoropolyether polymers having chemical structure different from polymer P according to the present invention, silicone oils.

Suitable (per)fluoropolyether oils free from silane groups are for example those having an average molecular weight of from 1,000 to 30,000, such as Fomblin® Z, Fomblin® M and Fomblin® Y commercially available from Solvay Specialty Polymers Italy S.p.A, Demnum™ commercially available from Daikin Industries and Krytox™ commercially available from Chemours.

Suitable silane-containing (per)fluoropolyether polymers having chemical structure different from polymer P [polymers Si] are for example polymers comprising a (per)fluoropolyether chain having two chain ends, wherein at least one chain end comprises at least one silane-containing group. Suitable polymers Si are for example those described in U.S. Pat. Nos. 6,277,485, 6,183,872, JP 2002-348370, U.S. Pat. Nos. 7,794,843 and 6,528,671 cited above.

Suitable silicone oils are linear or cyclic silicone oils, such as dimethylsilicone oil, methylphenyl silicone oil, methylhydrogensilicon oil and dimethylsiloxane oil.

Composition C can be used as such or diluted. The skilled person can determine the most suitable concentration of polymer P depending on the method used to coat the substrate.

Preferably, said substrate has at least one surface comprising hydroxy groups. Without being bound by any theory, the Applicant believes that the presence of hydroxy groups onto the surface of the substrate to be coated encourage the interaction and bonding of the alkoxy-silane groups [groups (Si)] with the surface of the substrate itself.

Preferably, the substrate (or at least a surface thereof) is made of glass, ceramic, metal and polymeric substrates. The hydroxy groups may originally exist in the material constituting the surface of the substrate or they can be created onto said surface by suitable treatment (for example under plasma containing oxygen atmosphere or in a corona atmosphere).

Preferably, step (m1) can be performed by using methods known in the art, including wet coating and dry coating.

Wet coating methods include for example dip coating, spin coating, flow coating, spray coating, roll coating and the like.

Typically, when a wet coating method is used, the composition C is diluted such that polymer P is in an amount of from 0.0005 to 10 wt. % based on the total weight of the composition C, and then it is applied to the surface of the substrate.

Dry coating methods include for example vacuum coating (or vacuum deposition) sputtering and the like.

Typically, when a dry coating method is used, composition C is used without being diluted. Optionally, a catalyst can be added to composition C.

When vacuum coating is used, pellets are obtained by impregnating a porous metal (such as iron or copper) with composition C, optionally containing a suitable catalyst.

Depending of the methods used, step (m1) can be performed at room temperature, for example at about 20-30° C., or step (m1) is performed after pre-heating of the substrate at a temperature of from 50° C. to 200° C.

Preferably, before step (m1), an optional step (m0) of cleaning the surface of the substrate is performed in order to remove possible organic and inorganic contaminants.

Preferably, said step (m0) is performed by washing with an organic solvent, such as acetone or ethanol, or by exposure to a reactive gas-phase treatment, such as air plasma.

Optionally, step (m1) is followed by step (m2) of curing and/or drying.

Preferably, step (m2) is performed by allowing the coated substrate to stand in a humid environment or by applying thermal energy or radiation (such as UV, IR, electron bean radiation).

The thickness of the coating obtained using polymer P or composition C is not particularly limited. It is preferably in the range from 1 to 30 nm, more preferably from 1 nm to 10 nm.

The coating obtained using polymer P or composition C as defined above is notably useful as fingerprint resistant coating on touch panels (such as for example on smart phones, tablets, PCs, smart TVs, portable media players and advertising displays), as anti-reflective coating, as water and oil repellent coating and antifouling coating on glazing in transporting vehicles, sanitary articles and so on.

Another aspect of the present invention relates to the use of polymer P or composition C, as defined above, for providing a coating onto at least one part of the surface of a substrate.

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

EXPERIMENTAL SECTION

Example 1—Synthesis of Polymer P1 (0+2) Having the Following Formula: $CF_3O(CF_2CF_2O)_p(CF_2O)_q$ $CF_2CH_2OCH_2CH[OCH_2CH_2CH_2S(OCH_3)_3]$ $CH_2OCH_2CH_2CH_2Si(OCH_3)_3$ Step 1: Synthesis of the PFPE Di-Alcohol (0+2) 4000 MW The mesyl derivative of Solketal was prepared following the procedure of example 1 of EP 2197939 A (Step 1), which comprises the reaction of Solketal with methanesulfonyl chloride.

200.00 g of ZMF 4000-402 PFPE of formula $CF_3O(CF_2CF_2O)_p(CF_2O)_qCF_2CH_2OH$ (p/q~1, EW=3306, 60.5 meq), 20.32 g of mesyl derivative of Solketal (96.8 meq) and 200.00 g of 1,3-bis(trifluoromethyl)benzene were charged into a 500-ml round bottom flask equipped with a mechanical stirrer, a thermometer and a refrigerant.

Then, 7.33 g of potassium hydroxide in powder (85% w/w, 111.0 meq) was added under stirring. The solution was heated to 70° C. while stirring and kept at this temperature for 20 hours, than it was cooled to 20° C. and washed with an aqueous solution of hydrochloric acid 0.17 M (2×220 g).

The organic phase was separated and the fluorinated solvent was removed by distillation under reduced pressure (T=70° C., P=2 Pa). The product was filtered through a 0.2 μm PTFE membrane leaving 189.30 g of the PFPE alcohol (0+2) having the following formula: $CF_3O(CF_2CF_2O)_p$ $(CF_2O)_qCF_2CH_2OCH_2CH(OH)CH_2OH$.

Step 2: Synthesis of the PFPE Di-Allyl (0+2) 4000 MW 150.0 g of the PFPE alcohol (0+2) 4000 MW prepared as described in Step 1 above, 55.0 g of 1,3-bis(trifluoromethyl) benzene and 103.7 g of a 12% w/w solution of potassium tert-butoxide in tert-butanol were charged into a 500-ml round bottom flask, equipped with a mechanical stirrer, an addition funnel, a thermometer and a refrigerant.

The obtained mixture was heated up to 50° C. and let under stirring for 1 hour. The temperature was raised up to 90° C. and 19.4 g of allyl iodide (EW=168, 115.4 meq) were added and the reaction was kept at this temperature for 24 hours.

The reaction mixture was cooled down to 20° C., added with 80 g of an aqueous solution of hydrochloric acid (5% w/w), 75.0 g of isobutyl alcohol, let under stirring for 30 min and transferred into a separatory funnel.

The lower fluorinated phase was separated and the solvent was removed by distillation under reduced pressure (T=80° C., P=2 Pa). The product was filtered through a 0.2 μm PTFE membrane leaving 148.8 g of the PFPE allyl (0+2) having the following formula: $CF_3O(CF_2CF_2O)_p(CF_2O)_q$ $CF_2CH_2OCH_2CH(OCH_2—CH=CH_2)CH_2OCH_2—$ $CH=CH_2$ that was confirmed by $^{19}F$-NMR and $^{1}H$-NMR analyses.

Step 3: Synthesis of the PFPE Di-Silane (0+2) 4000 MW 100.0 g of the PFPE allyl (0+2) prepared as described in Step 2 above, 75.0 g of 1,3-bis(trifluoromethyl) benzene and 0.013 g of a Pt(0)-based catalyst (26% metal content) were charged into a 250-ml round bottom flask, equipped with a mechanical stirrer, an addition funnel, a thermometer and a refrigerant and kept under nitrogen.

The temperature was raised up to 80° C. and 17.7 g of trimethoxysilane (EW=122.0, 144.8 meq) were added and the reaction was kept under stirring at this temperature until complete disappearance of the signal pf the starting allyl functional group, monitored by $^{1}H$-NMR analysis.

The solvent was eventually distilled off under reduced pressure (T=80° C., P=2 Pa) yielding 105.3 g of polymer P1 and minor amounts of a polymer having one or more vinyl-ether group(s).

Example 2—Synthesis of Polymer P2 (0+3) Having the Following Formula: $CF_3O(CF_2CF_2O)_p(CF_2O)_q$ $CF_2CH_2OCH_2CH[OCH_2CH_2CH_2S(OCH_3)_3]$ $CH_2OCH_2CH[OCH_2CH_2CH_2Si(OCH_3)_3]$ $CH_2OCH_2CH_2CH_2Si(OCH_3)_3$ Step 1: Synthesis of the PFPE Tri-Alcohol (0+3) 4000 MW Step 1.1: Reaction of Solketal Alkoxide with Epibromohydrin 9.14 g of sodium hydride (95%, 361.8 meq) and 310.00 g of anhydrous toluene were charged into a 500-ml round bottom flask equipped with a magnetic stirrer, a thermometer, a water cooled condenser with a bubble counter and a dropping funnel containing 47.50 g of Solketal 98% (352.2 meq). The Solketal was added to the suspension of NaH in toluene under stirring over 1 hour. The reaction mass was heated to 50° C. under stirring for 1 hour, then cooled down to room temperature and transferred via a double-ended needle to a second dropping funnel mounted on a 1 L round bottom flask containing 104.70 g of epibromohydrin (98%, 748.9 meq) and equipped with a magnetic stirrer, a thermometer and a water cooled condenser with a bubble counter. After heating to 60° C., the sodium alkoxide of Solketal was added dropwise to the epibromohydrin over 1.5 hours under stirring. The reaction mixture was then kept at 60° C. under stirring for further 5 hours before cooling to room temperature. After filtration on a 0.45 μm PTFE membrane filter and removal of the excess reagent and solvent by vacuum distillation (T=40° C., P=2 Pa) the crude product was distilled to give glycidyl Solketal ether having the following formula:

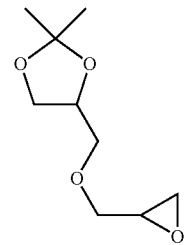

Step 1.2 Reaction of ZMF 4000-402 PFPE with the Product of Step 1.1

200.00 g of ZMF 4000-402 PFPE of formula $CF_3O$ $(CF_2CF_2O)_p(CF_2O)_qCF_2CH_2OH$ (p/q~1, EW=3410, 58.7 meq), 1.36 g of potassium tert-butylate (97%, 11.8 meq) and 13.60 g of anhydrous tert-butanol were charged into a 1 L round bottom flask equipped with a magnetic stirrer, a thermometer, a refrigerant and a dropping funnel containing 22.05 g (117.3 meq) of the glycidyl Solketal ether obtained as described in step 1.1 above, in 65.00 g of 1,3-bis (trifluoromethyl)benzene. After heating under stirring for 2 hours at 60° C., the temperature was increased to 80° C. and the solution in the dropping funnel was gradually added over 2 hours. After 5 hours of further reaction, the reaction mass was cooled to room temperature and added with 50.00 g of methanol, 50.00 g of isobutanol and 200.00 g of an aqueous solution of hydrochloric acid 0.35 M. The system was vigorously stirred at 65° C. for 4 hours and, after cooling and phase separation, the lower organic layer was collected. The procedure was repeated and the solvents removed by distillation at 80° C. under reduced pressure (P=2 Pa) to afford 204.29 g of the PFPE alcohol 0+3 with formula $CF_3O$ $(CF_2CF_2O)_p(CF_2O)_qCF_2CH_2OCH_2CH(OH)CH_2OCH_2CH$ $(OH)CH_2OH$.

Step 2: Synthesis of the PFPE Tri-Allyl (0+3) 4000 MW 150.0 g of the PFPE alcohol 0+3 4000 MW, prepared in Step 1.2, (p/q~1, EW=1151, 130.3 meq), 80.0 g of 1,3-bis (trifluoromethyl) benzene and 152.3 g of a 12% w/w solution of potassium tert-butoxide in tert-butanol were charged into a 1 L round bottom flask, equipped with a mechanical stirrer, an addition funnel, a thermometer and a refrigerant. The obtained mixture was heated up to 50° C. and let under stirring for 1 hour. The temperature was raised up to 90° C. and 28.5 g of allyl iodide (EW=168, 169.4 meq) were added and the reaction was kept at this temperature for 28 hrs. The reaction mixture was cooled down to 20° C., added with 110.0 g of an aqueous solution of hydrochloric acid (5% w/w), 85.0 g of isobutyl alcohol, let under stirring for 30 min and transferred into a separatory funnel. The lower fluorinated phase was separated and the solvent was removed by distillation under reduced pressure (T=80° C., P=2 Pa). The product was filtered through a 0.2 μm PTFE membrane leaving 144.9 g of the PFPE allyl (0+3) with formula: $CF_3O(CF_2CF_2O)_p(CF_2O)_qCF_2CH_2OCH_2CH(OCH_2CH=CH_2)CH_2OCH_2CH(OCH_2CH=CH_2)CH_2OCH_2CH=CH_2$ that was confirmed by $^{19}F$-NMR and $^{1}H$-NMR analyses.

Step 3: Synthesis of the PFPE Tri-Silane (0+3) 4000 MW 100.0 g of the PFPE allyl 0+3 4000 MW, prepared in step 2, (p/q~1, EW=1185, 84.3 meq), 100.0 g of 1,3-bis(trifluoromethyl) benzene and 0.019 g of a Pt(0)-based catalyst (26% metal content) were charged into a 250-ml round bottom flask, equipped with a mechanical stirrer, an addition funnel, a thermometer a refrigerant and kept under nitrogen. The temperature was raised up to 80° C. and 25.8 g of trimethoxysilane (EW=122.2, 210.9 meq) were added and the reaction was kept under stirring at this temperature until complete disappearance of the signal pf the starting allyl functional group, monitored by $^1H$-NMR analysis. The solvent was eventually distilled off under reduced pressure (T=80° C., P=2 Pa) yielding 104.9 g of polymer P2 and minor amounts of a polymer having one or more vinyl-ether group(s).

The invention claimed is:

1. A process [process P] for the manufacture of a polymer P, wherein polymer P comprises at least one (per)fluoropoly ether chain [chain ($R_{pf}$)] and at least two chains [chains ($R_e$)] bonded to opposite sides of said chain ($R_{pf}$), wherein at least one chain ($R_e$) comprises a branched alkyl chain interrupted by at least two oxygen atoms [chain ($C_o$)], and two or more alkoxy-silane groups [groups (Si)], said process comprising:

reacting at least one PFPE-alcohol polymer, wherein the PFPE-alcohol polymer comprises a fully or partially fluorinated polyether chain ($R_{pf}$) having two chain ends, and wherein at least one chain end bears at least one hydroxy group, with a compound (O), wherein compound (O) comprises at least two protected hydroxy groups and a group reactive with the hydroxy group of the PFPE-alcohol, to give a polymer $Pp^{\#1}$ comprising a (per)fluoropolyether chain ($R_{pf}$) having two chain ends, wherein at least one chain end comprises a linear or branched alkyl chain optionally interrupted by at least one oxygen atom, and at least two protected hydroxy groups;

deprotecting the at least two protected hydroxy groups in polymer ($Pp^{\#1}$), to give a polymer ($P^{\#1}$) comprising a (per)fluoropolyether chain ($R_{pf}$) having two chain ends, wherein at least one chain end comprises a linear or branched alkyl chain optionally interrupted by at least one oxygen atom, and at least two hydroxy groups;

reacting polymer ($P^{\#1}$) with at least one compound (A), wherein compound (A) comprises at least one alkenyl group, to give a polymer ($P^{\#2}$) comprising a (per)fluoropolyether chain ($R_{pf}$) having two chain ends, wherein at least one chain end comprises a linear or branched alkyl chain interrupted by at least two oxygen atoms, and at least two alkenyl groups; and reacting polymer ($P^{\#2}$) with an alkoxy-silane compound [compound Si], to give polymer P.

2. The process according to claim 1, wherein said compound (O) is selected from:

activated protected triol compounds [compound ($O^{P1}$)] comprising an alkyl chain bearing at least two hydroxy groups in protected form and a functional group having high reactivity toward nucleophilic substitution reactions and epoxide compounds [compound ($O^{P2}$) comprising an alkyl chain bearing at least two hydroxy groups in protected form and an epoxide group, said alkyl chain being optionally interrupted by oxygen atoms.

3. The process according to claim 1, wherein said compound (A) is selected from the group consisting of alkenyl-halide and alkenyl-alcohol.

4. The process according to claim 3, wherein said alkenyl halide selected from the group consisting of: allyl halides, vinyl halides, and butenyl halides.

5. The process according to claim 1, wherein reacting polymer ($P^{\#1}$) with compound (A) comprises:

reacting polymer ($P^{\#1}$) with a compound ($A^{a1}$), wherein compound ($A^{a1}$) comprises at least one allyl group and a functional group having high reactivity toward nucleophilic attack, to give polymer ($P^{\#2}$).

6. The process according to claim 1, wherein reacting polymer ($P^{\#1}$) with compound (A) comprises:

reacting polymer ($P^{\#1}$) with an activating agent, to give the corresponding polymer ($P^{\#1a}$), wherein polymer ($P^{\#1a}$) comprises a (per)fluoropolyether chain ($R_{pf}$) having two chain ends, wherein at least one chain end comprises a linear or branched alkyl chain interrupted by at least one oxygen atom and at least two functional groups having high reactivity toward nucleophilic attack, and reacting said polymer ($P^{\#1a}$) with an allyl-alcohol compound ($A^{b2}$), to give polymer ($P^{\#2}$).

7. The process according to claim 6, wherein said activating agent is selected from compounds of formula:

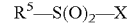

wherein

X is chlorine or bromine, and $R^5$ is selected from the group consisting of: linear or branched alkyl chain having from 1 to 12 carbon atoms, optionally comprising fluorine atoms; and aryl group, optionally substituted with one or more alkyl groups having from 1 to 3 carbon atoms.

8. A process [process P] for the synthesis of a polymer P wherein polymer P comprises at least one (per)fluoropoly ether chain [chain ($R_{pf}$)] and at least two chains [chains ($R_e$)] bonded to opposite sides of said chain ($R_{pf}$), wherein at least one chain ($R_e$) comprises a branched alkyl chain interrupted by at least two oxygen atoms [chain ($C_o$)], and two or more alkoxy-silane groups [groups (Si)], said process comprising:

reacting at least one PFPE-alcohol polymer comprising a fully or partially fluorinated polyether chain ($R_{pf}$) having two chain ends, wherein at least one chain end bears at least one hydroxy group, with a compound $A^X$, wherein compound $A^X$ comprises at least two alkenyl groups and one hydroxyl group, to give a polymer ($P^{\#2}$), wherein polymer ($P^{\#2}$) comprises a (per)fluoropolyether chain ($R_{pf}$) having two chain ends, wherein at least one chain end comprises a linear or branched alkyl chain interrupted by at least two oxygen atoms, and at least two alkenyl groups; and reacting polymer ($P^{\#2}$) with an alkoxy-silane compound [compound Si], to give polymer P.

9. A polymer [polymer ($P^{\#1}$)] comprising at least one (per)fluoropolyether chain ($R_{pf}$) and at least two chains ($R_e^{\#1}$) bonded to opposite sides of said chain ($R_{pf}$), wherein at least one chain ($R_e^{\#1}$) comprises a linear or branched alkyl chain interrupted by two or more oxygen atoms [chain ($C_o^{\#1}$)], and five or six hydroxyl groups.

10. A polymer [polymer ($P^{\#2}$)] comprising at least one (per)fluoropolyether chain ($R_{pf}$) and at least two chains ($R_e^{\#2}$) bonded to opposite sides of said chain ($R_{pf}$),
wherein at least one chain ($R_e^{\#2}$) comprises a branched alkyl chain interrupted by at least two oxygen atoms [chain ($C_o^{\#2}$)], and two or more alkenyl groups.

11. A mixture comprising:
a polymer P, wherein polymer P comprises at least one (per)fluoropoly ether chain [chain ($R_{pf}$)] and at least two chains [chains ($R_e$)] bonded to opposite sides of said chain ($R_{pf}$), wherein at least one chain ($R_e$) comprises a branched alkyl chain interrupted by at least two oxygen atoms [chain ($C_o$)], and two or more alkoxysilane groups [groups (Si)], and a polymer [polymer $P^{\#3}$] comprising a (per)fluoropolyether ($R_{pf}$) having two chain ends, wherein at least one chain end comprises a linear or branched alkyl chain interrupted by at least two oxygen atoms, and one or more vinyl-ether group(s).

* * * * *